No. 684,337. Patented Oct. 8, 1901.
T. WRIGHT.
POCKET FILTER.
(Application filed May 31, 1901.)
(No Model.)

Thomas Wright, Inventor.

Witnesses
C. C. Walker
J. Rossbottom

By Henry T. Bright
Attorney

UNITED STATES PATENT OFFICE.

THOMAS WRIGHT, OF ALLEGHENY, PENNSYLVANIA.

POCKET-FILTER.

SPECIFICATION forming part of Letters Patent No. 684,337, dated October 8, 1901.

Application filed May 31, 1901. Serial No. 62,575. (No model.)

*To all whom it may concern:*

Be it known that I, THOMAS WRIGHT, a citizen of the United States, residing at Allegheny, in the county of Allegheny and State of Pennsylvania, have invented certain new and useful Improvements in Pocket-Filters; and I do hereby declare the following to be a full, clear, and exact description of the invention, such as will enable others skilled in the art to which it appertains to make and use the same.

This invention relates to filters, and particularly to that class designed for use in combination with a cup or like vessel.

The object of this invention is to provide a novel filter proper in which the filtering agent is of such porosity as to permit the water to pass therethrough under the suction applied by the user or, in other words, the filtering agent is of such consistency as to permit of the water being drawn therethrough by drawing the air from a tube and creating a vacuum.

Furthermore, the object of this invention is to provide a combined drinking-cup and casing in which the filter proper is stored for transportation, and, furthermore, in the provision of novel means for engaging the filter and preventing its moving in its case.

Furthermore, the object of the invention is to provide means for holding the filtering agent in fixed relation to its shell and at the same time allowing a space between the outer surface of the filtering agent and its shell, into which the water is drawn.

Finally the object of the invention is to produce a combined filter and drinking-cup which will possess advantages in points of efficiency, simplicity, and inexpensive structure.

With the above and other objects in view the invention consists in the details of construction and in the arrangement and combination of parts to be hereinafter more fully set forth and claimed.

In describing the invention in detail reference will be had to the accompanying drawings, forming part of this specification, wherein in like characters denote corresponding parts in the several views, and in which—

Figure 1:
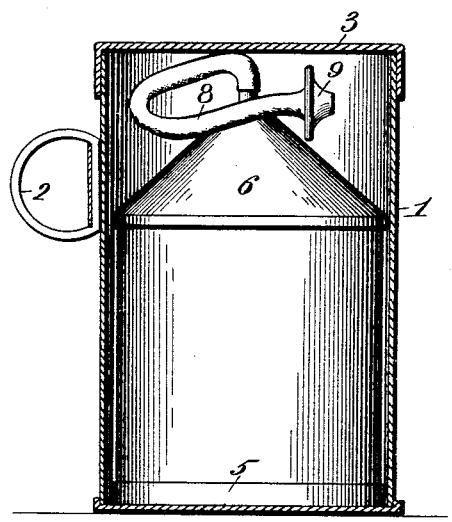
Figure 2:
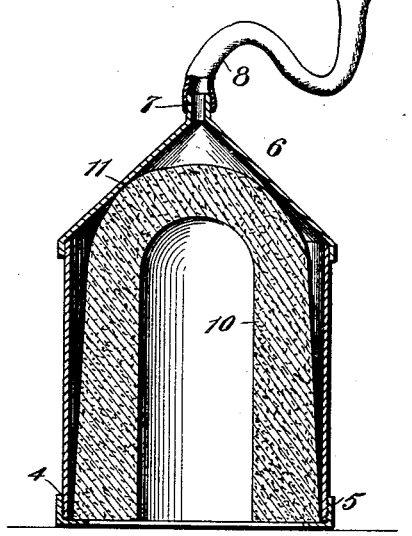
Figure 4:
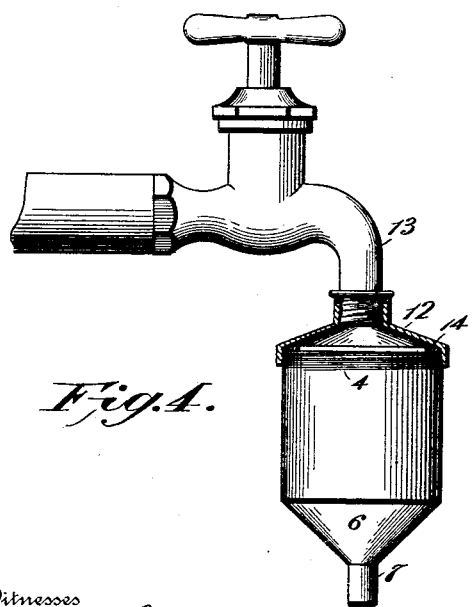
Figures 3, 5:
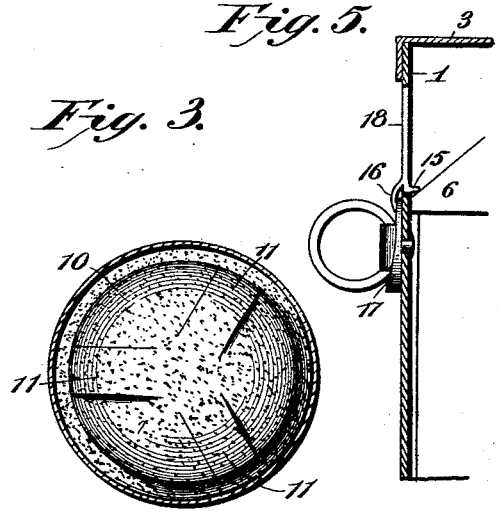

Figure 1 is a sectional view of the drinking-cup, showing the filter in elevation. Fig. 2 is a vertical sectional view of the filter. Fig. 3 is a sectional view of the filter-casing and a top plan view of the filtering agent. Fig. 4 is a view in elevation, partly in section, showing the adaptability of the filter in connection with an ordinary cock. Fig. 5 is a fragmental sectional view embodying a slight modification.

In the drawings, 1 indicates the drinking-cup, having a handle 2 and a cover 3. The cup serves the double function of inclosing and confining the filter for transportation and also holds water to be drawn through the filter.

The filter comprises a casing open at one end and provided with screw-threads 4, to which is threaded a retaining-ring 5. The opposite end is provided with a conical cap 6, terminating in a nipple 7, which has a preferably flexible pipe 8 and the pipe in turn having a mouthpiece 9. The filtering agent 10 within the casing is shaped similar to an inverted U, with its lower edge bearing against the retaining-ring. The diameter of the filtering agent at the lower edge is just equal to the diameter of the casing inside, so that sidewise displacement thereof will be obviated. The filtering agent tapers toward the top and its outer surface has ribs 11, which bear against the conical cap to prevent a movement of the filtering agent within the case. The interstices between the ribs admit of the free passage of water to the nipple as a vacuum is created by drawing air from the pipe.

It will be observed that the retaining-ring may bind the ribs against the cap, so that the filtering agent is secured against movement in any direction; yet said filtering agent is readily removed for the purpose of cleansing or renewing by the displacement of the retaining-ring.

As shown in Fig. 4, the filter is inverted, and as a substitute for the retaining-ring I supply a threaded cover 12, having a threaded nipple, by which it is connected to the cock 13. A gasket 14 is interposed between the cover and the casing to insure a water-tight joint.

In the construction shown in Fig. 5 I disclose a means for retaining the filter in the cup, this comprising a resilient tongue 18, cut from the body of the cup, provided with a lug 15, bearing against the filter to prevent its movement. The tongue is provided with an outwardly and downwardly curved flange 16, which rests against the cam-faced disk 17, said disk being pivoted to the cup. As said disk is rotated it will draw the tongue from engagement with the filter, and when turned back to the position illustrated the filter will be engaged and held.

Having fully described my invention, what I claim as new, and desire to secure by Letters Patent, is—

1. In a filter, a casing, a filtering agent fitting in the casing and having ribs bearing against the casing, a ring screwed on the casing for retaining the filtering agent in place and a connection through which water is drawn from the filter.

2. In a filter a casing, a filtering agent formed in the shape of an inverted U and having ribs on its outer convexed surface a retaining-ring screwed on the casing and pressing the ribs into engagement with the casing substantially as described.

3. In a filter, a casing, a filtering agent therein, a drinking-cup to receive the filter and a latch for retaining the filter in place.

In testimony whereof I affix my signature in presence of two witnesses.

THOMAS WRIGHT.

Witnesses:
J. W. FORDENBACHER,
JAMES KEAY.